ation, Jul./Aug. 1984.

United States Patent [19]

Damiano et al.

[11] Patent Number: 4,616,305
[45] Date of Patent: Oct. 7, 1986

[54] AC/DC POWER MOSFET REVERSING H-DRIVE SYSTEM

[75] Inventors: Michael A. Damiano, Germantown; Richard F. Schmerda, Oak Creek, both of Wis.

[73] Assignee: Eaton Corporation, Cleveland, Ohio

[21] Appl. No.: 700,843

[22] Filed: Feb. 11, 1985

[51] Int. Cl.[4] ............................................. H02M 7/538
[52] U.S. Cl. ................................... 363/132; 318/293; 318/681
[58] Field of Search ................... 363/17, 37, 127, 131, 363/132; 318/293, 681; 307/571

[56] References Cited

U.S. PATENT DOCUMENTS 4,545,004 10/1985 Kade et al. ......................... 363/132

OTHER PUBLICATIONS

The MPP 500-The First Single Package Complementary MOS Power Device by Ray Ruble, Powerconversion International, Jul./Aug. 1984.

Primary Examiner—Patrick R. Salce
Assistant Examiner—Anita M. Ault
Attorney, Agent, or Firm—C. H. Grace; W. A. Autio

[57] ABSTRACT

A power MOSFET reversing H-drive system having a first pair of N-channel and P-channel MOSFETs (Q1,Q2) connected in series with a load (LD1,LD2) to a power supply source (T1) and a second like pair of N-channel and P-channel MOSFETs (Q3,Q4) connected in series with the load (LD1,LD2) to the source (T1), each pair having a resistance voltage divider (R1-R2, R5-R6) for providing the P-channel MOSFET (Q1,Q3) with a different voltage level gate signal from the logic level input signal by which the N-channel MOSFET (Q2,Q4) is gated, an overvoltage protector (Z1,Z2) allowing extension of the supply voltage (T1) range under which the system is operable, and the on-state resistances and the flyback current capability of the intrinsic diodes (ID1-ID4) being matched to the size of the load to be driven.

7 Claims, 3 Drawing Figures

AC/DC POWER MOSFET REVERSING H-DRIVE SYSTEM

BACKGROUND OF THE INVENTION

MOSFET (metal oxide semiconductor field effect transistor) H-drives have been known heretofore. For example, Ray Ruble in an article entitled "The MPP 500" on pages 14, 19 and 20 of Powerconversion International of July/August 1984 shows in FIG. 2a a Low Voltage Fast Bridge wherein each upper FET is driven from the drain of the lower FET and shutoff is accomplished with one pullup resistor for each upper FET. For reactive loads, to avoid reverse conduction through the intrinsic diodes or dv/dt effects during switching which could damage the P-channel MOSFETs, at input voltages below forty volts, Schottky diodes in parallel with the MOSFET intrinsic diodes are sufficient, since the forward drop of the Schottky diodes is less than the intrinsic diode drop. At higher voltages, that is, thirty to ninety volts, more complex arrays using blocking diodes and conducting diodes as shown in The High Voltage Fast Bridge of FIG. 2b of the above publication have been required. Also, as shown in said FIG. 2b, capacitive coupling for the gates of the upper FETs has been used and functions by using the input capacitance of the upper FET as half of a capacitive voltage divider which divides the voltage change in the drain of the lower FET to a level appropriate for gate drive on the upper FET. In this arrangement, P-channel and N-channel MOSFETs with equal input capacitances are used.

While these systems have been useful for their intended purpose, they have been handicapped by being limited in voltage applications to ninety volts or less. Also, the capacitive coupling slows down or limits the operating speed of the system. It also limits how long it can be turned on (the duty cycle) because the capacitor will charge and then after a time interval it shuts itself off. Also, it has additional power dissipation when turned on due to the forward voltage drops of the two blocking diodes VSK320 that are forward biased. Moreover, this prior MOSFET system that uses capacitive coupling is not likely to function properly on an AC system because the capacitor will conduct current all of the time. Moreover, the number of components including the four conducting diodes IN6080 and the four blocking diodes VSK320 is large.

It has been found desirable to provide an AC/DC power MOSFET reversing H-drive system that overcomes the above disadvantages.

SUMMARY OF THE INVENTION

An object of the invention is to provide an improved H-drive system.

A more specific object of the invention is to provide an improved power MOSFET H-drive system operable on either alternating current (AC) or direct current (DC).

Another specific object of the invention is to provide an improved power MOSFET H-drive system using P-channel and N-channel MOSFETs wherein the intrinsic diodes of the MOSFETs are matched with respect to their current capacity.

Another specific object of the invention is to provide an improved power MOSFET H-drive system using P-channel and N-channel MOSFETs having resistance voltage divider gate control for each P-channel MOSFET directly from the drain of the respective N-channel MOSFET and gate voltage overload protection for the P-channel MOSFETs to allow operation on a wider range of supply voltage.

Another specific object of the invention is to provide an improved power MOSFET H-drive system using P-channel and N-channel MOSFETs and matching the on-state resistance and the flyback current capability of the MOSFETs and their intrinsic diodes to the size of the load to be driven.

Other objects and advantages of the invention will hereinafter appear.

DESCRIPTION OF THE PREFERRED EMBODIMENT

Figure 1:
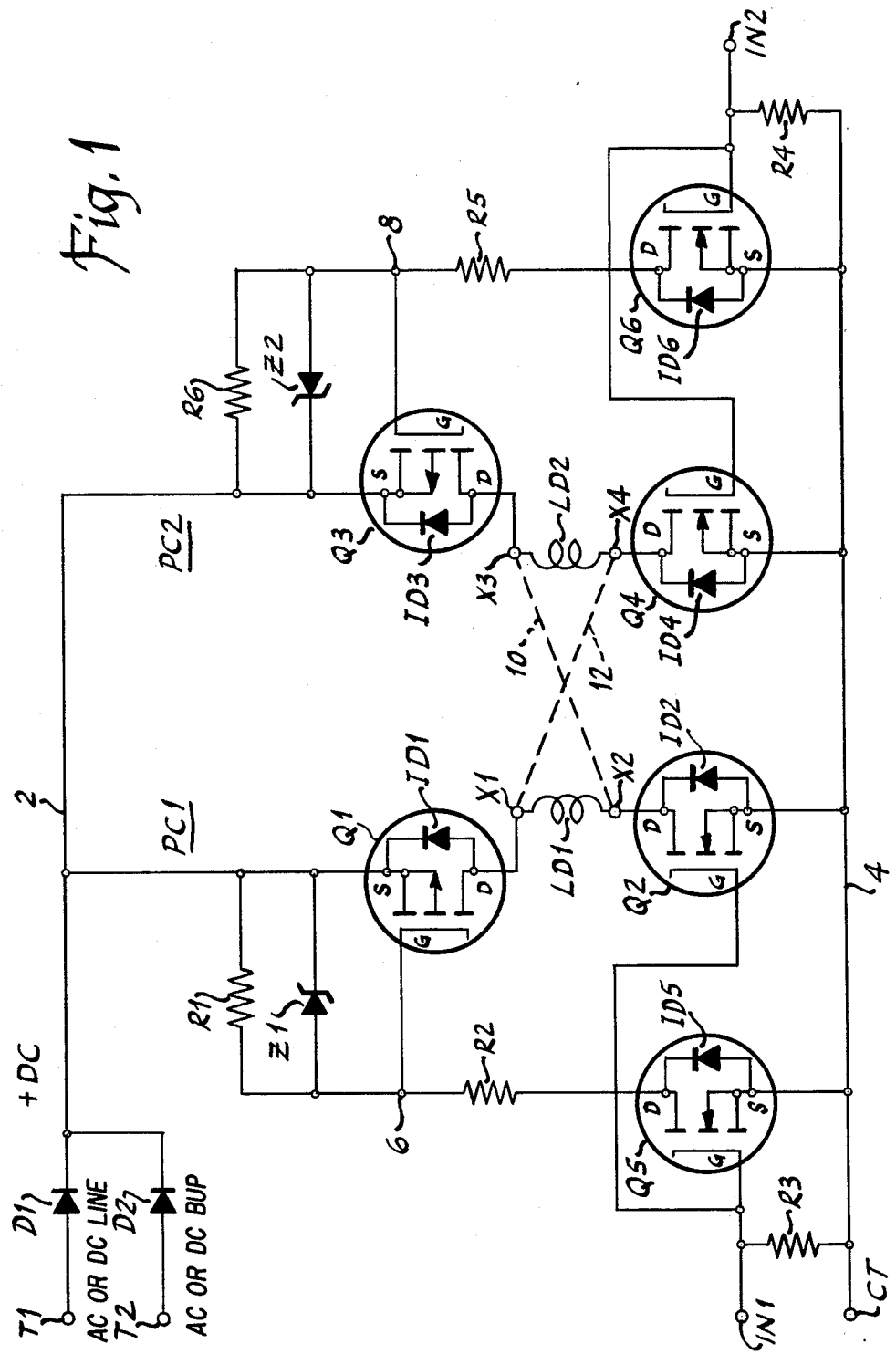
FIG. 1 is a circuit diagram of a first embodiment of an AC/DC power MOSFET reversing H-drive system.

Referring to FIG. 1, there is shown a first version of an AC/DC power MOSFET reversing H-drive system. As shown therein, primary electrical power is applied from an AC or DC power line or source at terminal T1 through a unidirectional diode D1 to a positive DC conductor 2. In addition, AC or DC backup power is applied from terminal T2 through a unidirectional diode D2 to positive DC conductor 2. A pair of power circuits PC1 and PC2 are connected from positive DC conductor 2 to common conductor 4 which leads to negative or common terminal CT. Power circuit PC1 includes a P-channel power MOSFET Q1, a load coil LD1 and an N-channel power MOSFET Q2 in series in that order from conductor 2 to conductor 4. Since Q1 and Q2 are metal oxide semiconductor field effect transistors, they will also be referred to herein as transistors in addition to MOSFETs. For gate control of transistor Q2, there is provided a first input terminal IN1 that is connected directly to the gate G of transistor Q2. For gate control of transistor Q1 which is a P-channel type and requires a different voltage level than is required for gating of the N-channel type transistor Q2, there is provided a third MOSFET Q5 of the N-channel type having its gate G connected to input terminal IN1, its source S connected to common conductor 4 and its drain D connected through a resistance voltage divider including resistors R2 and R1 in series to positive DC conductor 2 with the junction 6 between these resistors being connected to gate G of transistor Q1. A zener diode Z1 having a rating of ten volts or the like is connected in parallel with resistor R1 across source S and gate G of transistor Q1 so as to limit the maximum gating voltage of transistor Q1 and thereby allow operation of the system at a higher supply voltage range. As will be apparent, each of the transistors Q1, Q2 and Q5 has an internal or intrinsic diode ID1, ID2 and ID5, respectively. A pull-down resistor R3 is connected from input terminal IN1 to common terminal CT to cause turn-off of transistors Q2 and Q5 whenever the input logic level signal of eight to fifteen volts DC or the like becomes disconnected or is removed from input terminal IN1.

Power circuit PC2 is similar to power circuit PC1 just described and includes a MOSFET Q3, a load coil LD2 and a MOSFET Q4 connected in series in that order from positive DC conductor 2 to common conductor 4. For gate control of transistor Q4 a second input terminal IN2 is connected directly to gate G thereof. For gate control of transistor Q3, there is provided a third MOSFET Q6 having its gate G connected to input terminal IN2, its source S connected to common conductor 4 and its drain D connected through resistance voltage divider resistors R5 and R6 to positive DC conductor 2 with the junction 8 between these resistors being connected to gate G of transistor Q3. A zener diode Z2 having a voltage rating of ten volts DC or the like is connected in parallel with resistor R6 across source S and gate G of transistor Q3 to limit the control voltage that can be applied to transistor Q3 and thereby allow operation of the system at higher supply voltage ranges. A pull-down resistor R4 is connected between input terminal IN2 and common conductor 4 to cause turn-off of transistors Q4 and Q6 whenever the logic level signal voltage of eight to fifteen volts DC or the like is removed or becomes disconnected from input terminal IN2.

Load coils LD1 and LD2 may be cross connected at their terminals X1, X2 and X3, X4 as shown by broken lines 10 and 12 for reversing operation of the load or, if these broken line connections are left out, each power circuit will operate its own load.

Applying an input signal to input terminal IN1 causes turn-on of transistors Q2 and Q5. Transistor Q5 causes current flow through voltage divider resistors R1 and R2 to cause turn-on of transistor Q1. As a result, load LD1 is energized by current flow through transistors Q1 and Q2, this current flowing downwardly through load coil LD1. If cross connections 10 and 12 are in place, this also causes current flow upwardly through load coil LD2. If cross connections 10 and 12 are not in place, then power circuit PC1 will energize only its own load LD1.

Application of a logic level control signal to second input terminal IN2 causes turn-on of transistors Q4 and Q6. Such operation of transistor Q6 causes current flow through voltage divider resistors R6 and R5 for turn-on of transistor Q3. As a result, load coil LD2 is energized by current flow through transistor Q3, then downwardly through load coil LD2 and through transistor Q4. If cross connections 10 and 12 are in place, this also causes current flow upwardly through load coil LD1. Otherwise, power circuit PC2 energizes only its own load LD2.

From the foregoing, it will be apparent that cross connections 10 and 12 provide for reversing operation of a load such as a motor or the like. In such case, control signals are applied to input terminals IN1 and IN2 alternatively, not at the same time. Thus, application of a control signal to an input terminal IN1 will cause energization of load coils LD1 and LD2 in one direction whereas application of a control signal to input terminal IN2 will cause energization of load coils LD2 and LD1 in the opposite direction such as for motor reversal or the like. On the other hand, if cross connections 10 and 12 are removed, the system can be used for operation of two-coil relays, for example, relays having a close coil and a trip coil so that power circuit PC1 would energize the close coil whereafter the relay would remain closed and power circuit PC2 would energize the trip coil thereby to reopen the relay.

Figure 2:
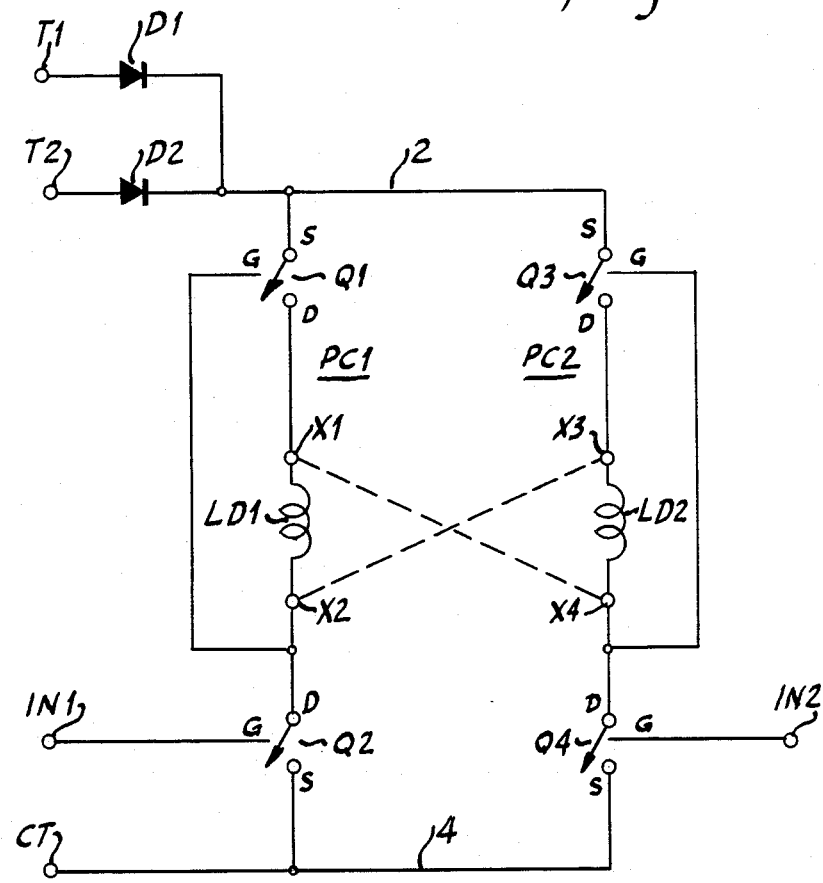
FIG. 2 is a schematic illustration of a simplified and improved embodiment of the AC/DC power MOSFET reversing H-drive system.

The system of FIG. 1 can be simplified further in the manner shown schematically in FIG. 2. Reference characters like those used in FIG. 1 are shown in FIG. 2 for like elements. Also, terminals X1 and X2 of load coil LD1 and terminals X3 and X4 of load coil LD2 are shown cross connected by broken lines 10 and 12 to show this alternative or optional connection. For simplification, it will be apparent from FIG. 2 that for control of MOSFET Q1, MOSFET Q5 of FIG. 1 can be eliminated and the drain D of MOSFET Q2 connected directly to the gate of MOSFET Q1 in power circuit PC1. In a similar manner in power circuit PC2, MOSFET Q6 of FIG. 1 can be eliminated and the drain D of the MOSFET Q4 connected directly to the gate G of MOSFET Q3. The details of these connections are shown in more detail in FIG. 3 and described in connection therewith hereinafter.

Figure 3:
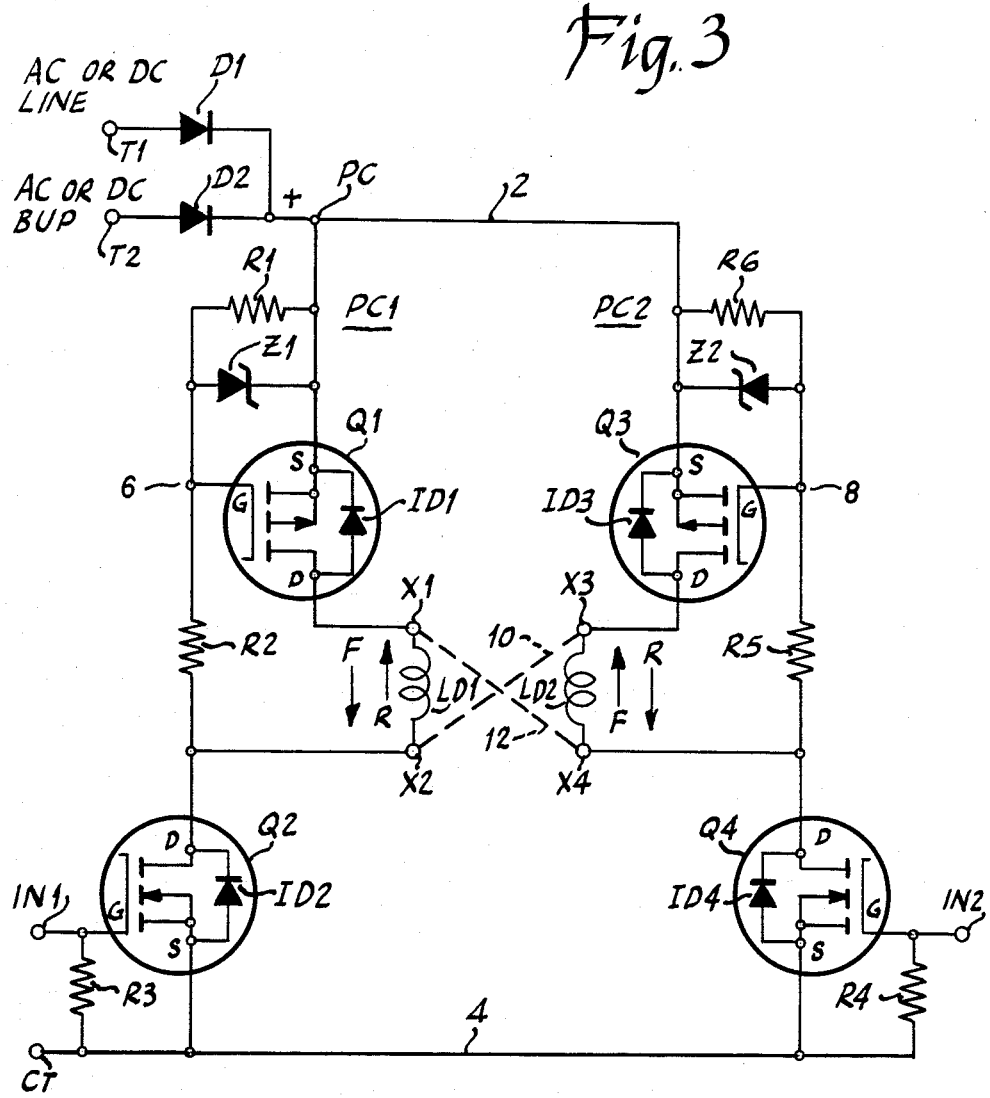
FIG. 3 is a circuit diagram of the system of FIG. 2 showing the circuit details thereof and constructed in accordance with the invention.

In FIG. 3, reference characters like those shown in FIGS. 1 and 2 have been used for like elements. In FIG. 3, instead of using an additional MOSFET for gate control of transistor Q1 as in FIG. 1, drain D of transistor Q2 is connected through voltage divider resistors R2 and R1 to positive power conductor 2 with the junction 6 between these resistors being connected directly to gate G of transistor Q1. In a similar manner, drain D of transistor Q4 in power circuit PC2 is connected through voltage divider resistors R5 and R6 to positive conductor 2 with the junction 8 between these resistors being connected directly to gate G of transistor Q3, thus eliminating the necessity of the additional MOSFET Q6 as in FIG. 1.

For operation of the system of FIG. 3, let it first be assumed that cross connections 10 and 12 shown in broken lines are not present so that power circuits PC1 and PC2 operate loads LD1 and LD2 independently. For this purpose, application of a control logic level signal to first input terminal IN1 causes turn-on of transistor Q2. This causes current flow through voltage divider resistors R1 and R2 and application of a different voltage level signal (different from the level of the signal applied to input terminal IN1) directly from junction 6 to gate G of transistor Q1 to cause turn-on thereof. As a result, current flows through transistor Q1, then downwardly through load LD1 and through transistor Q2 to energize the load.

In a similar manner application of a logic level signal to second input terminal IN2 causes turn-on of transistor Q4. This causes current flow through voltage divider resistors R6 and R5 and application of a different voltage level signal (different from the level of the signal applied to second input terminal IN2) directly from junction 8 to the gate G of transistor Q3 to turn on this transistor. This causes current flow through transistor Q3 and then downwardly through load LD2 and through transistor Q4 to energize the load.

As hereinbefore described, this type of independent operation of load coils LD1 and LD2 is suitable for two coil relays or the like wherein power circuit PC1 operates a close coil and power circuit PC2 operates a trip coil.

Assuming now that terminals X1 and X2 of load coil LD1 are cross connected as shown by broken lines 10 and 12 with terminals X3 and X4 of load coil LD2, input signals should not be applied simultaneously but should be applied alternately to input terminals IN1 and IN2. Under this H-drive arrangement, an input signal at the first input terminal IN1 will cause current flow downwardly through load LD1 and upwardly through load LD2 whereas an alternative input signal at input terminal IN2 will cause current flow downwardly through load coil LD2 and upwardly through load coil LD1 for reverse energization of the load which may be a motor or the like.

By use of rectifying diodes D1 and D2, it will be apparent that the system can be used with either a DC or an AC source. In FIG. 3, transistors Q1 and Q3 are P-channel MOSFETs whereas transistors Q2 and Q4 are N-channel MOSFETs as hereinbefore described in connection with FIG. 1. In order to provide a system with the least number of components, it has been found advantageous to match the on-state resistance and the flyback current capability of the MOSFETs and their intrinsic diodes ID1–ID4 to the size of the load LD1-LD2 to be driven. This has been found preferable to matching the MOSFETs to equal capacitance as in the prior art because equal timing by capacitors means that the P-channel MOSFETs can't handle nearly as much current as the N-channel MOSFET of an equivalent input capacitance. Also, the intrinsic diodes in the P-channel MOSFETs can't handle the flyback current, thus requiring added external components for these purposes and much slower operation as in the prior art. In addition, the system shown in FIG. 3 by using resistance voltage dividers and zener diodes for P-channel MOSFET protection, extends the power supply voltage range under which the system can be operated. Also, the system shown in FIG. 3 can be operated with either an AC or a DC supply, or both simultaneously, which is not possible in the prior art systems.

While the apparatus hereinbefore described is effectively adapted to fulfill the objects stated, it is to be understood that the invention is not intended to be confined to the particular preferred embodiments of AC/DC power MOSFET reversing H-drive system disclosed, inasmuch as they are susceptible of various modifications without departing from the scope of the appended claims.

We claim:

1. A power MOSFET reversing H-drive system having a first pair of N-channel and P-channel MOSFETs connected for completing a power circuit to a load and a second pair of N-channel and P-channel MOSFETs connected for completing a power circuit to the load and logic level signal means for gating each of said N-channel MOSFETs selectively into conductive state; and a power supply connected to said power circuits characterized by:

said N-channel and P-channel MOSFETs having their on-state resistances and the flyback capability of their intrinsic diodes matched to the size of the load to be driven, thereby avoiding the necessity of any auxiliary components to handle the flyback currents or any other power dissipating elements in series in said power circuits;

means for selectively directly gating said N-channel MOSFETs into conductive state;

means comprising a pair of resistance voltage dividers responsive to gating each of said N-channel MOSFETs respectively into conductive state for applying a gating signal directly therefrom to the corresponding P-channel MOSFET to gate the same into conductive state thereby to cause energization of the load to be driven thereby;

and gate turn on voltage overload protection means connected to each of said P-channel MOSFETs whereby to afford operation of said H-drive system throughout a wider input power supply voltage range.

2. The power MOSFET H-drive system claimed in claim 1, wherein:

said power supply is either a DC or AC rectified power supply and the source of each P-channel MOSFET is connected to the positive side of said supply whereas the source of each N-channel MOSFET is connected to the other side of said supply.

3. The power MOSFET H-drive system claimed in claim 2, wherein:

each of said resistance voltage dividers comprises a pair of resistors connected in series between the positive side of said power supply and the drain of said N-channel MOSFET with the junction between said resistors being connected to the gate of the corresponding P-channel MOSFET so that the positive voltage side resistor of said pair thereof is across the source and gate of said P-channel MOSFET.

4. The power MOSFET H-drive system claimed in claim 3, wherein:

said gate voltage protection means comprises a zener diode connected across each said positive voltage side resistor to limit the source-gate voltages on said P-channel MOSFETs.

5. The power MOSFET H-drive system claimed in claim 1, wherein:

said load is a two-section load coil with the first coil section thereof being connected between the P-channel and N-channel MOSFETs in said first power circuit and the second coil section thereof being connected between the P-channel and N-channel MOSFETs in said second power circuit.

6. The power MOSFET H-drive system claimed in claim 5, wherein:

the opposite ends of said first and second coil sections are cross-connected so that alternate operation of said power circuits results in reversing energization of said coil sections of said load.

7. The power MOSFET H-drive system claimed in claim 1, wherein:

each of said N-channel MOSFETs is provided with a gate-to-common connected pull-down resistor serving as a gate capacitance discharge path to insure that the corresponding power circuit will go to its off state if the gate signal connection is lost or opened.

* * * * *